United States Patent

[11] 3,632,369

[72] Inventor Granville J. Hahn
  Big Spring, Tex.
[21] Appl. No. 884,353
[22] Filed Dec. 11, 1969
[45] Patented Jan. 4, 1972
[73] Assignee Cosden Oil & Chemical Company
  Big Spring, Tex.
  Continuation-in-part of application Ser. No. 525,854, Feb. 8, 1966, now abandoned,
  Continuation-in-part of application Ser. No. 576,208, Aug. 31, 1966, now abandoned,
  Continuation-in-part of application Ser. No. 594,998, Nov. 17, 1966, now Patent No. 3,484,262. This application Dec. 11, 1969, Ser. No. 884,353

[54] POLYMER PIGMENTATION
  10 Claims, No Drawings
[52] U.S. Cl. .................................. 117/16,
  117/100, 117/138.8
[51] Int. Cl. .................................. B44d 1/02,
  B05c 5/00
[50] Field of Search .................. 117/100 C, 138.8, 16

[56] References Cited
UNITED STATES PATENTS

| | | | |
|---|---|---|---|
| 2,445,928 | 7/1948 | Sommer | 117/100 X |
| 2,572,068 | 10/1951 | Sommer | 117/100 X |
| 2,817,604 | 12/1957 | Louis | 117/100 X |
| 2,945,634 | 7/1960 | Beck et al. | 241/98 |
| 2,987,496 | 6/1961 | Simpson | 260/40 |
| 3,035,003 | 5/1962 | Kessler | 117/100 X |
| 3,011,904 | 12/1961 | Ballentine et al. | 117/100 X |
| 3,047,534 | 7/1962 | Dyer | 260/45.5 |
| 3,056,752 | 10/1962 | Zweigle | 260/2.5 |
| 3,057,751 | 10/1962 | Nagle | 117/100 |
| 3,058,926 | 10/1962 | Eichhorn | 117/100 X |
| 3,083,116 | 3/1963 | Bernot | 117/100 X |
| 3,085,989 | 4/1963 | Jordan | 117/100 X |
| 3,090,755 | 5/1963 | Erchak | 117/100 X |
| 3,104,196 | 9/1963 | Shannon | 117/100 X |
| 3,154,604 | 10/1964 | McMillan | 117/100 X |
| 3,185,588 | 5/1965 | Resnick | 117/100 X |
| 3,196,032 | 7/1965 | Seymour | 117/100 X |
| 3,236,702 | 2/1966 | Sapiego | 117/100 X |
| 3,245,829 | 4/1966 | Beaulieu | 117/100 X |
| 3,291,762 | 12/1966 | Raymond | 117/100 X |
| 3,296,154 | 1/1967 | Ferrigno | 117/100 X |
| 3,361,688 | 1/1968 | Bonitz | 117/100 X |
| 3,369,927 | 2/1968 | Voris | 117/100 X |
| 3,484,282 | 12/1969 | Hahn | 117/100 X |

FOREIGN PATENTS

| | | | |
|---|---|---|---|
| 200,753 | 7/1970 | Australia | 117/100 |

Primary Examiner—Murray Katz
Assistant Examiner—Mathew R. P. Perrone, Jr.
Attorney—Sol B. Wiczer

ABSTRACT: Particles of polyethylene, polypropylene, polyacrylic lower alkyl esters, and polymethacrylic lower alkyl esters are pigmented by progressively mixing the dry particles with dry pigment in a high-speed mixer having a blade tip speed exceeding about 200 inches per second for a short period of a few minutes or less, whereby all of the pigment becomes firmly adhered to the surfaces of the polymer particles.

POLYMER PIGMENTATION

This invention is a continuation-in-part of my copending application Ser. No. 525854, filed Feb. 8, 1966, and now abandoned, Ser. No. 576208, filed Aug. 31, 1966, now abandoned and Ser. No. 594998, filed Nov. 17, 1966, and now U.S. Pat. 3,484,262, and relates to abrasively adhered dry pigment upon polymer particles.

This invention specifically relates to abrasion-adhered dry pigment upon polymer particles and the method of making such particles.

More particularly, the abrasion-adhered dry particles are usually powder formed by grinding (1) polyethylene pellets; (2) polypropylene pellets; (3) polyacrylic lower alkyl ester pellets; and (4) polymethacrylic lower alkyl ester, the lower alkyl being one to four carbon atoms, usually methyl.

The term "particles" as used herein refers preferably to ground pieces, but is broad enough to include ground shapes, beads and powder. The term "particles" as used here may have a large screen mesh size ranging upward from about 20 mesh sometimes to as high as about 5 mesh, U.S. Standard sieve. Preferably the colored particles of the present invention is powder, having a screen mesh size in the range of about 200 to 20 U.S. Standard sieve.

The pigment hereof is any dry powdered coloring or pigmenting material insoluble in the polymer particles to be colored. Such pigment is usually colored inorganic salts or metallo organic compounds and may be elementary metal powder or metal oxides per se.

According to the present invention I have found that a markedly improved colored polymer particle as defined above is formed by abrasively or intensively mixing the polymer particles with pigment in a dry stage such as by a high-speed rotating blade mixer; for example, a Prodex-Henschel, preferably having a rotational tip speed exceeding about 200 inches per second and ranging upward practically as high as 500 to 1,500 inches per second. At such blade speeds the moving surfaces of the blade abrasively rubs the powdered pigment into the surface of the polymer particles, such as beads, powder or rounded pellets, causing a surprisingly firm surface adhesion therebetween. This high-intensity abrasive mixing breaks up flocs of colored pigment and transfers the same as very fine pigment particles, evenly distributed over the surface of the beads, powder, or rounded pellets as a relatively strongly adhered coating on the surfaces and also held in the surface pores or irregularities microscopically occuring upon the particles.

The abrasive, high-intensity mixing procedure hereof does not need to be applied for unduly long periods of time. For small mixers operating with small quantities, even less than a minute, such as 15 to 30 seconds, can effect a substantial adhesion of the pigment upon the polymer particles. For lower intensity abrasive forces applied in the dry mixing, the adhesion effect becomes available in a somewhat more poorly adhered state by abrasively mixing for longer periods of time. The abrasive adhesion method hereof is in substantial contrast to mere dusting and tumbling of powdered pigment upon powder or to application of liquid compositions to effect the pigmentation according to prior proposals.

The present procedure produces a surprisingly unique product in that the pigment becomes relatively firmly adhered to the particle surfaces, rubbing off only with great difficulty, and only substantial abrasive rubbing against wet surfaces allows removal of any empirically significant quantity of the pigment once adhered by this method.

Great advantages attend the present abrasive mixing method. There is greatly reduced dusting of pigment per se. Such dust as appears in the final product is usually substantially the very fine pigmented bead per se. The procedure is available to give a more homogeneous color mixed in the desired proportions as set in the mixing to allow accurate reproduction of the color desired. The procedure allows formation of a masterbatch of color as a commercial product which can be blended back by the molder to the color needed in the molding by simple admixture of colorless beads to reduce the color intensity from the masterbatch. Surprisingly, the pigment upon the abrasively colored particles hereof does not transfer from the colored surfaces to other particles; for instance, white particles that may have been mixed with a precolored batch of particles do not become colored. The colored particles hereof remain stably colored with a surprising nontransferrable color from the pigmented particles to the unpigmented particle, remaining as a heterogeneous salt-and-pepper mix. Some pigments in varying degrees affect the physical properties of the plastic particles and molded products thereof, rendering it in some cases more flexible.

An outstanding advantage of the present method is that in a short period of intensive abrasive mixing of small particles, a finished pigmented product is available for molding. The product is homogeneous and the color is firmly adhered. The pigment is stably adhered and will not rub off. The colored particles are filled into a mold to give a superior reproducible color to the final molded product without intermediate steps of pelleting, etc., as presently widely practiced.

While, as stated, the larger particles such as pellets can be abrasively coated, the larger pelleted particles have a much reduced surface area and, consequently, cannot secure the pigment in so firm a bond to its surface as smaller particles; nor do the larger pelleted particles present a large enough surface to allow the pigment to be distributed as evenly thereover. Consequently, the larger pellets give a somewhat poorer distribution of pigment and adhesion of pigment to the surfaces thereof.

The present invention provides in the art a true, much simplified solid-state dry coloring process for dry polymer particles which permits the manufacture of an easily reproduced colored polymer molding particle, usable often for high quality end products having superior physical properties.

In accordance with the present invention, an improved colored polymer particle product and method is provided for making colored polymer particles. This method includes the abrasive high-intensity mixing of pigment and small solid particles of polymer material. The conditions of mixing are such that the intensity is sufficient to break down agglomerates of pigment, while abraiding the pigment and forcing it to adhere to the particles so that substantial dusting will not occur on subsequent handling.

Preferably the intensity of mixing applied by the present method is sufficient to cause the discrete particles of pigment to enter surface regions of the polymer particles. To accomplish this purpose, the intensity of mixing is kept high while the size of pigment utilized is limited to comparatively small pigment, i.e., on the order of about 1 micron or less.

Mixing is preferably accomplished with a rotating blade-type mixer in which a linear velocity on the outer part of the blades at least as high as 200 inches per second, and usually about 500 to 1,500 inches per second, is achieved.

The product provided by the present invention is particles of polymer material having pigment tightly adhered to its surface portions only, the adherence appearing to involve the entrapment of pigment within surface depressions or indentures in the outer regions of the particle and may be a factor to account for the low dusting, strong pigment adhesion of this product.

The preferred dried, colored particles provided by the present invention are powders of polyethylene, polypropylene, polyacrylic lower alkyl esters and poly methacrylic lower alkyl ester, the lower alkyl being one to four carbon atoms.

While various processes may be utilized for obtaining a suitable polymer for practice of the present invention, a typical process involves grinding pelleted polymer using a conventional knife type grinder. In such process a pelleted polymer is typically one-sixteenth to one-fourth of an inch in size and may be reduced in a series of grinding steps or in one step such that the particle size of the resulting powder is in the range of 200 to 20 U.S. Standard sieve. Thereafter the resulting powder is mixed with pigment in the abrasive high intensity mixing conditions described. Other particles or powders may be obtained by means such as the suspension polymerization of monomers wherein the resulting hard bead polymer is approximately 200 to 20 U.S. Standard sieve. In such a suspension process the monomer may be stirred in water in a heated reaction vessel accompanied by various suspension agents until such time as a hard polymer particle results. Thereafter these polymer particles may be recovered and dried.

The polymer particles are loaded into a high intensity mixer together with a suitable quantity of pigment. The individual pigment particle size is preferably comparatively small, often no larger than on the order of about 1 micron. It is understood that these particles may exist in agglomerates, wherein several individual particles are clustered together; however, the abrasive mixing reduces and distributes such clusters or flocs as individual particles evenly over the surfaces of the polymer particles. Accordingly, individual pigment crystals or particles are driven abrasively in the course of the mixing into surface depressions in the polymer spheroid particles and remain firmly adhered therein. In the case of the polymer particles referred to, a certain amount of pore or depression structure adjacent the surface is already present to accommodate, or assist in accommodating the entrance of pigment particles into surface regions of the polymer particles. However, it is observed that the high-intensity mixing of the discrete pigment particles apparently causes the pigment to force its way into surface structure of the polymer particle even in instances when surface depressions are not of sufficient size or number to originally accommodate the pigment.

While it is not desired to be limited by theory, it appears that the high-intensity mixing drives or forces the pigment into the surface of the polymer particle. In some instances, it appears that the site of entrance of the pigment is scratched out or otherwise made by the abraiding action of the pigment itself.

It should be pointed out that the high-intensity mixing step is sufficient to accomplish two purposes: the agglomerates of pigment characteristic of prior art solid-state coloring methods are broken up; and an adherence of pigment to the bead or similar particle of polymer material is obtained. This degree of adherence will vary over wide limits, and although the words "adhere" or "adherence" are seen to be relative, they are taken herein to refer to a sufficient degree of adherence such that pigment will not rub off materially on the hands during the course of handling particles of polymer material which have been abrasively dry or solid-state mixed.

The adherence obtained is less in the case of the comparatively larger pigments which may be mixed in accordance with the present invention, such as ultramarine blue, phthalocyanine green or cadmium orange having particles of the order of about 1 micron up to 2 to 3 microns and better with smaller sized pigments such as white pigment (titanium dioxide), typically about 0.2 percent of a micron and carbon black even smaller.

To illustrate, high-intensity mixing may be conducted on a batch of beads with a cadmium orange pigment. The batch of colored polymer beads so obtained is set aside and a fresh batch of beads is mixed under conditions of high intensity with rutile titanium dioxide pigment to obtain a white bead. The two batches are then loaded into the high-intensity mixer in which they were originally colored and mixing is conducted in accordance with the same schedule of speed and time. Surprisingly, the product obtained is only a mixture of discrete orange and white polymer beads. There is substantially no transfer of color from the one bead batch to the other bead batch, even after a long period of high-intensity mixing.

To further illustrate, a batch of white polyethylene particles may be prepared by the high-intensity mixing of a polyethylene powder, with titanium dioxide pigment of about 0.2 micron particle size. On mixing, a good white-colored product is obtained. Thereafter, a batch of polyethylene powder of the same nature employed in the white batch is mixed with carbon black pigment of a particle size on the order of about 20 millimicrons. The resulting produce is a well-colored black polyethylene powder batch. The two batches are thereafter combined in the same type high-intensity mixing equipment in which they were originally colored. After mixing together under high-intensity conditions for a period of time substantially greater than was required for the initial coloring, it is observed that there is little or no transfer of the colors between the powders. Accordingly, the end product appears much as salt and pepper which has been shaken well together, with each retaining its own individual color characteristics.

The same experiment was repeated using polypropylene powder. As before, a portion of these powders were pigmented with titanium dioxide and another portion with carbon black. Each portion was well colored and their admixture, despite further agitation, showed no transfer of color from one powder to another.

By way of contrast, phthalocyanine green pigment may be dispersed throughout a batch of similar polymer particles under high-intensity mixing conditions. The end product may be set aside and subsequently mixed with a white, orange or black-colored product obtained by high-intensity mixing as described above. It is observed that the phthalocyanine green transfers slightly in the mixing process to the white, orange or black particle, as the case may be.

The character and extent of mixing will vary somewhat, usually ranging from about 15 seconds to 1 hour; typically, 15 seconds to 10 minutes at tip speeds from 500 to 1,500 inches per second, in order to be of sufficiently high intensity to abrasively mix the color and powder and fulfill objectives of the present invention.

Whether the pigment be a comparatively small one, as preferred, or a large one, the product of high-intensity mixing may be fed to a molding device such as an injection molding machine. Molded articles of quite high quality faithfully colored to specifications are obtained.

The colored particles obtained from the high-intensity mixing step may be extruded or otherwise processed as desired to obtain an intermediate or an end product. When contrasted to colored polyethylene products obtained by prior art technology, it is found that the present product has superior characteristics.

Various high-intensity mixers may be used. Typically these involve a rotating shaft which carries a transversely extending blade member or members such as an impeller turbine or the like. Preferably the mixing blade or blades are capable of achieving a linear tip velocity, as stated, of at least about 200 inches per second, and preferably about 500 to 1.500 inches per second. Exemplary of equipment which is satisfactory is the Papenmeier mixer, obtainable from Welding Engineers Inc., Morristown, Pa., as illustrated, and Prodex-Henschel mixer illustrated in U.S. Pat. No. 2,945,634, mentioned above.

Preferably the mixer combines the principle of moving the particles being mixed both locally and in gross. That is to say, it is designed to turn over the material well in order that all the material in the mixer will, in due course, be within the region of high shear supplied by the rapidly moving mixer blades. The mixer of U.S. Pat. 2,945,634, provides vertical mixing at high shear rates and, accordingly, accomplishes the objectives of both high shear local mixing and good movement in gross.

The mixer blade or rotor may operate at a variety of angular velocities, but it is important that a substantial peripheral speed be developed. For example, such commercial mixer with a pitched blade and having a radius of about 1/3 foot, may develop a speed on the order of about 720 inches per second at its blade tips, and can accomplish mixing of a batch of particles and small pigment aggregating about 2,000 grams in quantity in around 30 seconds. With some pigment, as little as 15 seconds will suffice, while in other instances a few minutes mixing will be desirable.

The following specific examples are offered by way of further illustration of the practice of the present invention and are not intended to be taken as limiting except to the extent that is specifically expressed in any given example.

EXAMPLE I

Polyethylene polymer particles are dry colored in accordance with the present invention by high-intensity mixing of the powder with a light red pigment, specifically CdS·CdSe·EaSO$_4$. The polyethylene polymer powder is prepared by grinding polyethylene pellets. The powder size ranges from about 20 mesh to about 200 mesh, with about 100 mesh being average. 11.35 grams of the light red pigment described above are added to a Papenmeier mixer along with the 2,270 grams of the polyethylene polymer particles and are blended therein for about 30 seconds at 1,800 r.p.m. Peripheral speed of the rotor ran on the order of about 720 inches per second. A thermocouple disposed clear of the mixer blades and into the body of the powder indicates a temperature of 80° F. was the maximum achieved during the course of mixing. At the end of the blending period, the powder was examined and found to be strongly adherently colored a light red. The color was uniformly dispersed. Upon examination under the microscope, it was found that the pigment had entered depressions in the surface of the particles and that there is a distinct distribution of color particles on the surface of the powder particles between the various sites of pigment embedded in surface regions of the powder particles. As examined by the naked eye, the powder appears to be quite thoroughly covered with pigment. The pigment-impregnated powder can be rubbed about in the hands, but the pigment does not rub off.

The colored powder of this example is used in various end product molding applications including injection molding, vacuum forming, and sheet extrusion. No. intermediate compounding steps are used. A high-quality molded end product is obtained which possesses superior physical and color characteristics.

EXAMPLE II

The procedure of example I is repeated with a like quantity of polypropylene powder of the same nature. However, a yellow pigment is used, specifically 11.35 grams of CdS·BaSO$_4$. The powder is colored the desired yellow, with the pigment well adhered in surface regions of the polymer particles. Microscopic examination at 500 power indicated that the pigment is actually embedded or entrapped within depressions in the polymer particle surface, as was observed in prior example.

End products formed from the beads of this example are high quality, as was the case in example I.

EXAMPLE III

The procedure of example I is repeated using the same quantity of polyethylene particles, but with 4.5 grams of ultramarine blue and mixing time of about 2 minutes. The resulting particles are firmly and nontransferably colored blue, possessing about the same good physical and color characteristics as in the preceding examples. Microscopic examination at 500 power indicates that at least a part of the pigment is actually embedded in surface irregularities as well as being evenly distributed over regions of the particle surfaces. When mixing time for the ultramarine blue particle mix is reduced to only 30 seconds, the resulting product appears to carry well-dispersed pigment, but application of hard hand rubbing abrasion will rub off some of the pigment. End products formed from the powder of this example are, however, of high, easily reproduced color quality. This is true even if the comparatively short mixing time of 30 seconds is employed instead of the two minutes first referred to in this example. The result of the shorter mixing time is not found to be in product quality, but rather only in the tendency of the resulting colored powder to evidence slight dusting.

EXAMPLE IV

The procedure of example I is repeated except that 2 grams of phthalocyanine green pigment are substituted for the pigment therein used and a 10 minute mixing time is employed. The particles obtained are well colored with a similar slight dusting as in example III. Even after 10 minutes of high-intensity mixing, a small amount of the pigment rubs off on the hands.

EXAMPLE IV

The procedure of example I is repeated, except that 11.5 grams of a finely pulverized mica carrying titanium dioxide on its surface, as the pigment, is used. The end products obtained by this example are of a metallic pearl color and possess good physical and color characteristics.

EXAMPLE VI

The procedure of example I is repeated except that to the polymer particles is added 45.4 grams of rutile titanium dioxide pigment. The pigment is found to be quite well adhered to the polymer particles. Microscopic examination at 500 power revealed that the pigment is embedded or entrapped in depressions in the polymer surface. Good results are achieved on molding end products without intermediate compounding steps.

EXAMPLE VII

Example I is repeated but, for the pigment therein employed, there is substituted 2.4 grams of a yellow pigment (specifically CdS·CdS·BaSO$_4$), 4.2 grams of light red pigment (specifically CdS·CdSe·BaSO$_4$), and 2.4 grams of carbon black. The three pigments and polymer particles are mixed to obtain well-colored brown polymer having the pigment firmly adhered to the polymer. On molding, high-quality product of desired brown color is formed from this powder.

EXAMPLES VIII–XIV

The foregoing examples are repeated except that polymethyl methacrylate is utilized as the polymer material. It is found that comparable results are obtained in all instances.

EXAMPLE XV

The procedure of example VII is repeated except that the quantity of pigment is increased 10-fold to 100 grams so that a masterbatch concentrate of the heavy brown color is formed, packaged and shipped as such in a nondusting, firmly adherent concentrate. Thereafter, the molder mixes the concentrate with 10 times the concentrate weight of fine uncolored polymer particles just prior to molding to form a nontransferrable salt and pepper concentrate and colorless mix, which is then molded. The final molded product is found to have the same fine-colored character as in example VII.

EXAMPLE XVI

Example I is repeated, using 4.5 grams of carbon black (pigment size ranging from about 0.007 to 0.045 microns). The polymer particles have the pigment well adhered and form high-quality end products of a quality black color.

EXAMPLE XVII

High-density polyethylene is extruded as in example XVIII, below, and similar spheroidal particles are obtained. 0.05 percent of ultramarine blue is added to the polyethylene particles and abrasively adhered. The pigment is firmly attached as in example XVIII.

EXAMPLE XVIII

Low-density polyethylene is extruded through a conventional extruder and the emerging strands are cut hot directly at the die face such as to obtain pellets that are spheroidal in appearance and about one-sixteenth to one-eighth inch in size. These particles are colored by abrasion agitation using 0.05 percent of ultramarine blue. The resulting particles have the ultramarine blue firmly attached and only by severe rubbing can the pigment be removed.

EXAMPLE XIX

Polypropylene is extruded such as to obtain a one-sixteenth-hot-cut particle of approximately one-sixteenth-inch size. To these particles are added 0.05 percent of light red pigment, specifically CdS·CdSeBaSO₄. The particles are mixed, using abrasive agitation such that the light red pigment firmly adheres an in example I.

EXAMPLE XX

Poly methyl methacrylate particles averaging 30 mesh in size are mixed with a yellow pigment, specifically CdS·BaSO₄, such as to obtain a 0.1 percent concentration of pigment. The mixture is then subjected to abrasive agitation as in example I. On completion, the color is found to have adhered firmly to the beads and cannot be removed except by severe rubbing.

From the foregoing description and examples, it will be appreciated that a process for making high-quality, colored polyethylene particles has been provided. Moreover, it will be understood that quality polymer end products may be made from such particles. Further, a stable color adherent particle of polymer material that will not dust nor rub off easily has been disclosed.

Having described the invention in connection with certain specific embodiments thereof, it is to be understood that further modifications may now suggest themselves to those skilled in the art, and it is intended to cover such modifications as fall within the scope and the claims appended hereto.

What is claimed is:

1. Pigmented polymer particles, said polymer particles having a pigment abrasively adhered to the surfaces thereof by mixing the polymer particles and dry powdered pigment in a rotary blade mixer having a tip speed exceeding about 200 inches per second, said polymer particles having a screen mesh size range of about 20 to 200 U.S. Standard Sieve and being selected from the group consisting of polyethylene, polypropylene, polymerized lower alkyl ester of acrylic acid in which the lower alkyl ester group has one to four carbon atoms, and polymerized lower alkyl ester of methacrylic acid in which the lower alkyl ester group has one to four carbon atoms.

2. Pigmented polymer particles as defined in claim 1 wherein the particles are rounded polyethylene pellets.

3. Pigmented polymer particles as defined in claim 1 wherein the particles are rounded polypropylene pellets.

4. Pigmented polymer particles as defined in claim 1 wherein the particles are rounded polymerized lower alkyl ester of acrylic acid pellets, the lower alkyl ester group having one to four carbon atoms.

5. Pigmented polymer particles as defined in claim 1 wherein the particles are rounded poly methylacrylate pellets.

6. Pigmented polymer particles as defined in claim 1 wherein the particles are rounded polymerized lower alkyl ester of methacrylic acid pellets, the lower alkyl having one to four carbon atoms.

7. Pigmented polymer particles as defined in claim 1 wherein the particles are rounded polymethyl methacrylate pellets.

8. Pigmented polymer particles as defined in claim 1 wherein the pigment is a dry powdered pigment substance insoluble in said polymer.

9. Pigmented polymer particles as defined in claim 1 wherein the pigment is carbon black.

10. Pigmented polymer particles as defined in claim 1 wherein the pigment is titanium dioxide.

* * * * *